Patented June 5, 1923.

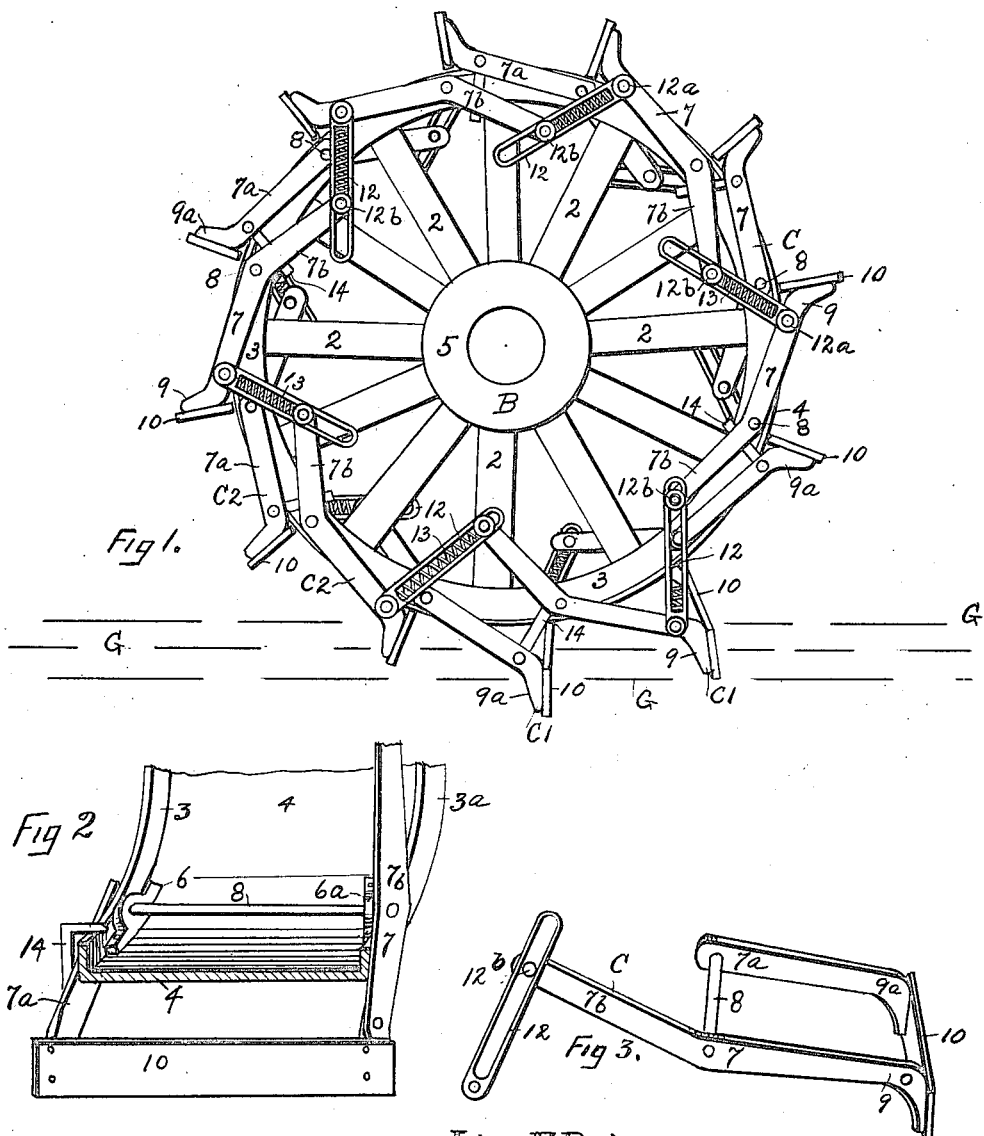

1,458,119

UNITED STATES PATENT OFFICE.

JOHN F. ROBERTS, OF FRESNO, CALIFORNIA.

GROUTER FOR WHEELS.

Application filed May 3, 1921. Serial No. 466,427.

*To all whom it may concern:*

Be it known that I, JOHN F. ROBERTS, a citizen of the United States, and resident of Fresno, in the county of Fresno and the State of California, have invented a new and useful Improvement in Grouters for Wheels, of which the following is a specification.

My invention relates in a general manner to traction wheels, and more particularly to a form of grouter which is to be attached to the rim of a traction wheel to prevent it from slipping. It is well known that grouters attached to the outside rim of a wheel will increase the traction power of the wheel, and that in practically all of the forms of grouters heretofore used such grouters are either constructed integral with the wheel rim, or they are bolted or riveted to the rim so that the relation of the grouter to the rim is the same in the entire revolution of the wheel. It is here noted that I filed an application in the United States Patent Office on October 23, 1920 for a patent on tractor wheels, Serial Number 418976, in which application I disclosed a form of grouter which was pivoted to the rim of the wheel. The invention for which I am applying for a patent covered in the specification hereinafter set forth is a modification of and an improvement on the invention described in the application above referred to. The object of my invention is to construct a traction wheel having grouters which are more effective in keeping the wheel from slipping than those heretofore in use, and which grouters automatically adjust and clean themselves to perform the function referred to when they approach the ground.

I accomplish the objects hereinbefore and hereafter set forth by means of the device described in this specification and illustrated in the accompanying drawing which is hereby made a part of said specification. In said drawing Figure 1 is a side view of a wheel having my improved grouters attached thereto. Figure 2 is an enlarged fractional view of the rim of a wheel at an angle showing the face of the grouters. Figure 3 is a different form of grouter.

In said drawing B is the wheel to which the grouters are attached. 5 is the hub of the wheel, 2 are the spokes, 4 the rim of the wheel, and 3 and $3^a$ are inside flanges on the rim 4, said flanges being on opposite sides of the wheel. 6 and $6^a$ are pivotal supports placed in pairs equidistant apart around the inside of the rim of the wheel and adjacent to the flanges. The pivotal supports 6 are adjacent to the flange 3, and those designated as $6^a$ are adjacent to the flange $3^a$. The supports 6 are directly across the rim from those designated $6^a$. C is the complete grouter and is constructed with a guiding arm 7 and a supporting arm $7^a$ which are connected with a pivot 8, which pivot passes through pivot supports 6 and $6^a$. When the grouter is assembled with the wheel the arms 7 and $7^a$ which are approximately parallel to each other, are on the outside of the flanges 3 and $3^a$, and are adapted to swing beyond the periphery of the wheel on pivot 8. The ends 9 and $9^a$ of the arms 7 and $7^a$ which ends are opposite to the pivot 8, are bent so that they extend uniformly outward from the wheel. Ends 9 and $9^a$ are connected with a blade, or stop member 10 which when the grouter is assembled, should be on the outside of the rim of the wheel. In my drawings I have shown the stop member 10 as passing directly across the face of the periphery of the wheel. It will be noted in the drawing that guiding arm 7 has an extension $7^b$, running from pivot 8 in an approximately opposite direction than the main arm 7. In my construction I have found it advisable to make the extension $7^b$ at an obtuse angle to the arm 7, said extension being bent toward the center of the wheel. It is also to be noted that each completed grouter is constructed with the guiding arm 7, having the extension $7^b$ thereon, and a supporting member $7^a$ on the opposite side of the wheel, that the sides of the wheel are duplicates and that the supporting arm $7^a$ alternates with the guiding arm 7. 12 is a link which is pivoted at one end with pivot $12^a$ to the guiding arm 7, adjacent to the bend which connects the end 9 with the main arm 7. The other end of link 12 is slidingly pivoted to the nearest adjacent extension $7^b$ by pivot $12^b$. 13 is an expansion spring which connects the arm 7 with the extension $7^b$ which are connected together with link 12. The object of the spring is to normally hold the pivots $12^a$ and $12^b$ and the members to which they are attached in close relationship, and to permit them to be pulled apart against the elasticity of the spring, and the object of link 12 is to form a guide and limit for the pivotal movement of the arms 7 and $7^a$ and the wing or stop member 10 attached thereto. 14 is a stop hook attached to the supporting arm 7ª and is adapted to catch on the flange 3 or 3ª to limit the downward movement of said arm. In the operation of this device it will be noted that the spring 13 will normally hold the grouter so that the stop member 10 is adjacent to the outside of the rim of the wheel, that as the wheel rotates and the stop member 10 comes in contact with the ground, the action of the rolling wheel will tend to turn the grouter on pivot 8 so that the pressure against the face of the stop member against the earth is on an angle downward. My experience has shown that when the face of the stop member is pressing in a downward direction it is much more effective in keeping the wheel from slipping than when the pressure against the earth is approximately on a horizontal plane and near the surface. In the latter the grouter will simply shovel the dirt away in the line of the rotation of the wheel. It will be observed that as the wheel rotates it will lift the grouter out of the ground when the vertical radius of the wheel has passed beyond any one of said grouters, and the grouter which is more nearly directly under the center of the wheel will perform the function of holding the wheel from slipping. In Figure 1 I have designated as $C^1$ one grouter imbedded in the ground G, and the adjacent grouter following as $C^2$. It will be noted that normally the movement of the wheel forward when one of the stops 10 strikes the earth it will sink into the earth and pull downward as is indicated by the position of grouter $C^1$. This action will raise extension $7^b$ which, through the function of link 12 will hold the blade of the grouter $C^2$ adjacent to the rim of the wheel until it is embedded in the earth. While I have shown spring 13 to be an ordinary expansion coil spring, it is here noted that I desire to cover equivalents of such springs which will perform the function of the spring described. The independent movement of the grouters tends to clean them of dirt by the fact that they move slightly apart and toward each other. In Figure 4 I have shown a modified form of grouter, the arm $7^b$ being substituted by an arm $7^{bb}$ placed midway between the supporting arms 7 and $7^a$. The object attained by the combination of arm $7^b$, link 12 and pivots $12^a$ and $12^b$ is that when any of the grouters are engaged with the ground when the wheel is in motion the grouter is pressed downward into the earth, and the grouters immediately above which are approaching the earth are held closely to the rim of the wheel until they are also imbedded in the ground.

Having described my invention I claim as new and ask for Letters Patent:

1. In combination with a traction wheel the combination of a grouter attached to arms pivoted to the rim of the wheel, the pivots permitting the grouter to be held adjacent to the periphery of the wheel or moved a spaced distance therefrom, an extension attached to said arms, and a link pivoted at one end to one of the arms, and the opposite end of the link being pivoted to said extension, said extension and link being adapted to move the grouter adjacent to the link toward the periphery of the wheel when the grouter attached to the arms is moved away from the wheel, substantially as described.

2. In combination with a traction wheel the combination of a grouter attached to arms pivoted to the rim of the wheel, the pivots permitting the grouter to be held adjacent to the periphery of the wheel or moved a spaced distance therefrom, an extension attached to said arms, and a link pivoted at one end to one of the arms, and the opposite end of the link being pivoted to said extension, said extension and link being adapted to move the grouter adjacent to the link toward the periphery of the wheel when the grouter attached to the arms is moved away from the wheel, and a spring normally adapted to hold the grouters adjacent to the periphery of the wheel.

JOHN F. ROBERTS.